United States Patent [19]

Haeffner et al.

[11] Patent Number: 5,011,594

[45] Date of Patent: Apr. 30, 1991

[54] PROCESS FOR THE CONTINUOUS EXTRACTION OF MIXTURES OF ORGANIC SUBSTANCES WITH SUPERCRITICAL SOLVENTS

[75] Inventors: Eckhard Haeffner, Clausthal-Zellerfeld; Hedi Ben-Nasr, Gelsenkirchen; Bernd Knuth, Essen; Hubert Jasper, Haltern; Klaus Reimann, Essen, all of Fed. Rep. of Germany

[73] Assignee: Fried. Krupp GmbH, Essen, Fed. Rep. of Germany

[21] Appl. No.: 285,387

[22] Filed: Dec. 16, 1988

[30] Foreign Application Priority Data

Dec. 18, 1987 [DE] Fed. Rep. of Germany ....... 3743058

[51] Int. Cl.$^5$ ............................................. C10G 21/00
[52] U.S. Cl. .................................... 208/320; 208/322; 208/334; 208/337; 208/952; 426/427; 426/429; 196/14.52
[58] Field of Search ............... 208/308, 311, 320, 322, 208/334, 337, 952; 426/427, 429; 196/14.52

[56] References Cited

U.S. PATENT DOCUMENTS

| 3,969,196 | 7/1976 | Zosel ................................. 208/308 |
| 4,104,409 | 8/1978 | Vitzthum et al. ................. 426/427 |
| 4,400,398 | 0/1983 | Coenen et al. .................... 426/429 |
| 4,675,101 | 6/1987 | Warzinski ......................... 208/311 |

FOREIGN PATENT DOCUMENTS

| 0171079 | 2/1986 | European Pat. Off. . |
| 0232481 | 8/1987 | European Pat. Off. ............ 208/311 |
| 1493190 | 9/1969 | Fed. Rep. of Germany ........ 203/49 |
| 1545391 | 1/1970 | Fed. Rep. of Germany . |
| 2127618 | 11/1972 | Fed. Rep. of Germany ...... 426/386 |
| 2458864 | 6/1975 | Fed. Rep. of Germany . |
| 3114593 | 12/1982 | Fed. Rep. of Germany ...... 426/429 |
| 3414977 | 5/1985 | Fed. Rep. of Germany . |
| 3346776 | 8/1985 | Fed. Rep. of Germany . |
| 3539432 | 6/1986 | Fed. Rep. of Germany . |
| 3545913 | 7/1986 | Fed. Rep. of Germany . |
| 3610369 | 10/1987 | Fed. Rep. of Germany . |

OTHER PUBLICATIONS

Heidi Brogle, "$CO_2$ as a Solvent: Its Properties and Applications", Jun. 1982, *Chemistry and Industry*, pp. 385–390.

*Primary Examiner*—Anthony McFarlane
*Assistant Examiner*—Nhat Phan

[57] ABSTRACT

A process for the continuous extraction of mixtures of organic substances including high boiling point constituents and/or constituents which do not boil but which melt with at least one solvent in the supercritical state, selected from the group consisting of $CO_2$, propane, butane, pentane, petroleum ether, water, and having a critical temperature, $T_k$, and a critical pressure, $P_k$, the process including providing an extraction vessel which comprises an extraction column, the extraction column extending vertically, having a head portion at the upper end thereof and a sump portion at the lower end thereof, and having a temperature gradient which decreases with increasing height from the sump portion to the head portion, wherein the sump portion has a temperature effective to maintain extraction residue in a viscous state which permits continuous removal thereof from the sump portion, and wherein the head portion has a temperature effective to provide an optimum solution of the constituents to be extracted in the at least one solvent in the critical state; and extracting the mixture of organic substances with the at least one solvent in the supercritical state at a pressure, P, ranging from $P > P_k$ up to $P < 400$ bar and at a temperature, T, of at least $T > T_k$ to provide a charged fluid phase comprised of extracted substances.

33 Claims, 2 Drawing Sheets

PROCESS FOR THE CONTINUOUS EXTRACTION OF MIXTURES OF ORGANIC SUBSTANCES WITH SUPERCRITICAL SOLVENTS

BACKGROUND OF THE INVENTION

1. Field of the Invention

The present invention relates to a method of processing mixtures of organic substances, including high boiling point constituents and/or constituents which do not boil but which melt, by extraction with supercritical solvents.

2. Description of the Related Art

German Auslegeschrift No. 1,493,190, which corresponds to U.S. Pat. No. 3,969,196, discloses a separation process employing supercritical gases for the separation of mixtures of substances which are liquid and/or solid under the process conditions and contain organic compounds and/or compounds including organic groups. According to this process, solids, such as naphthalene, phenanthrene or anthracene, and also natural substances, such as camphor or chlorophyll, can be taken into the supercritical phase like components or mixtures of substances which are liquid under process conditions.

German Patentschrift No. 3,114,593, which corresponds to U.S. Pat. No. 4,400,398, discloses a process for the recovery of aromatics and coloring matter from red peppers by means of a supercritical solvent. Useful solvents described therein include carbon dioxide, ethane, ethene and a mixture of ethane and ethene.

German Auslegeschrift No. 2,127,618, which corresponds to U.S. Pat. No. 4,104,409, discloses a method of producing hop extracts by the extraction of air-dried hops with a supercritical solvent.

European Patent Application No. 232,481 discloses a process for the production of hard coal tar pitch raw materials which are obtained from a supercritical solution by extraction with a supercritical gas and an entraining agent, and fractions are separated by stepwise changes in pressure and temperature. Aliphatic hydrocarbons having two to five carbon atoms and olefinic carbons having two to five carbon atoms, as well as halogen-containing hydrocarbons having one to four carbon atoms, are mentioned as specific solvents.

The production of montan wax from peat moss or soft coal by extraction with a supercritical solvent is disclosed in German Patent Application P 3,714,452. This application discloses $CO_2$, aliphatic hydrocarbons having two to five carbon atoms, petroleum ether, and water as useful solvents.

Because of poor yields, however, the prior art methods are generally unsatisfactory from an economic point of view and do not sufficiently exploit the raw materials.

SUMMARY OF THE INVENTION

It is therefore an object of the present invention to provide a process for the extraction of mixtures of organic substances, including high boiling point constituents and/or constituents which do not boil but which melt, so as to provide a greater yield of extracted product mixtures of organic substances and easy discharge of the extraction residue.

This object is accomplished according to the invention by providing a process for the continuous extraction of mixtures of organic substances including high boiling point constituents and/or constituents which do not boil but which melt with at least one solvent in the supercritical state, selected from the group consisting of $CO_2$, propane, butane, pentane, petroleum ether, water, and having a critical temperature, $T_k$, and a critical pressure, $P_k$, the process comprising: providing an extraction vessel which comprises an extraction column, the extraction column extending vertically, having a head portion at the upper end thereof and a sump portion at the lower end thereof, and having a temperature gradient which decreases with increasing height from the sump portion to the head portion, wherein the sump portion has a temperature effective to maintain extraction residue in a viscous state which permits continuous removal thereof from the sump portion, and wherein the head portion has a temperature effective to provide an optimum solution of the constituents to be extracted in the at least one solvent in the supercritical state; and extracting the mixture of organic substances with the at least one solvent in the supercritical state at a pressure, P, ranging from $P > P_k$ up to $P < 400$ bar and at a temperature, T, of at least $T > T_k$ to provide a charged fluid phase comprised of extracted substances.

The inventive process employs an extraction apparatus having an extraction vessel comprising an extraction column having a temperature gradient therein which decreases preferably linearly with increasing height from bottom to top of the extraction column. The extraction column is a vertical column and has a head portion at the upper end and a sump portion at the lower end thereof. The temperature in the head portion of the column is set so low that an optimum solution of the substances to be extracted in the solvent is ensured, that is the highest possible solubility with best possible quality for the extract. In this connection and as discussed in German Auslegeschrift No. 1,493,190, which corresponds to U.S. Pat. No. 3,969,196, consideration must be given to the fact that the quantity of substances dissolved in a solvent in the supercritical state is larger the closer the temperature comes to the critical temperature. On the other hand, easy discharge of extraction residue requires that the temperature in the sump of the column be set high enough to maintain the extraction residue as a viscous paste so that it is possible to continuously remove the pasty extraction residue from the extraction column sump. It is of particular advantage if the softening temperature of the extraction residue is at least 120° C. after degasification and even better if the softening temperature of the extraction residue after degasification ranges from 150° C. to 220° C. This can be realized by adjusting the process parameters, such as solvent ratio, i.e., kg solvent/kg starting material, temperature and pressure. As the temperature for an optimum solution is dependent on the extract and the softening temperature on the extraction residue, the temperature gradient is defined essentially by the extract and the extraction residue.

Generally satisfactory solvents to be utilized in the extraction process as supercritical solvents, i.e., solvents in the supercritical state, are $CO_2$, propane, butane, pentane, petroleum ether, water or a mixture of at least two of these solvents for use at a temperature, T, of $T > T_k$ ($T_k$ = critical temperature) and at a pressure, P, of $P > P_k$ ($P_k$ = critical pressure), preferably $P < 400$ bar. Carbon and petroleum products, for example, are preferably extracted with hydrocarbons having three to five carbon atoms as the supercritical solvent, either in pure form or as a mixture. $CO_2$ and propane are preferably employed as the supercritical solvent to product vegetable extracts.

Examples of mixtures of organic substances including high boiling point constituents and/or constituents which do not boil but which melt are listed below.

| Substance mixture: | Softening or melting points, (°C.): | Constituents to be separated because they interfere with further processing: |
|---|---|---|
| hard coal tar pitch | 71 | ashes, components insoluble in quinoline |
| residues from primary petroleum processing | 30 ... 80 | asphalt substances, porphyrins |
| hydration residues from carbon liquefaction | 40 ... 90 | ashes, catalyst, asphalt substances |
| hop extract | 30 ... 60 | tannins, sugar, hard resins, chlorophyll |
| raw montan wax | 70 ... 95 | resins, asphalt substances |

As a further feature of the invention, it is of advantage to add up to 20 weight % of at least one entraining agent, such as, for example, toluene, ethanol, propane, n-butane, iso-butane or mixtures thereof, to the solvent. This measure raises the selectivity of the process and improves the yield. For example, if a vegetable is extracted with $CO_2$ as the supercritical solvent, it is particularly advantageous to add propane, n-butane, iso-butane, ethanol and mixtures thereof as the entraining agent in order to increase the selectivity of the process.

If water is employed as the supercritical solvent, it is advantageous to liquefy the charged fluid phase from one extraction stage by reducing the temperature and pressure thereof to provide a mixture of water and extract. The mixture may then be subjected, at least in part, to extraction (re-extraction) in a second extraction column provided downstream of the first extraction column with a supercritical hydrocarbon or a supercritical hydrocarbon mixture, preferably with propane, n-butane, isobutane or a mixture thereof, and to separate the extract in fractions in subsequently-connected separators provided downstream of the extraction vessels. The separation conditions can be selected so that the extracted fractions are obtained substantially free of water.

Water may be advantageously added to the extraction column to facilitate removal of the extraction residue. If water is employed to facilitate removal of the extraction residue from the column, it is particularly advantageous to add substances to the water to improve wettability in order to increase the efficiency of removal.

In order to further improve the purity of fractions obtained in subsequently-connected separators, it is particularly advantageous if the first fraction is returned to the extraction column for reprocessing or is processed separately.

The economy of the process is improved significantly if the solvent is recirculated.

The subject matter of the invention will now be described in greater detail with reference to the drawing figures and a few examples.

DESCRIPTION OF THE PREFERRED EMBODIMENTS

Figure 1:
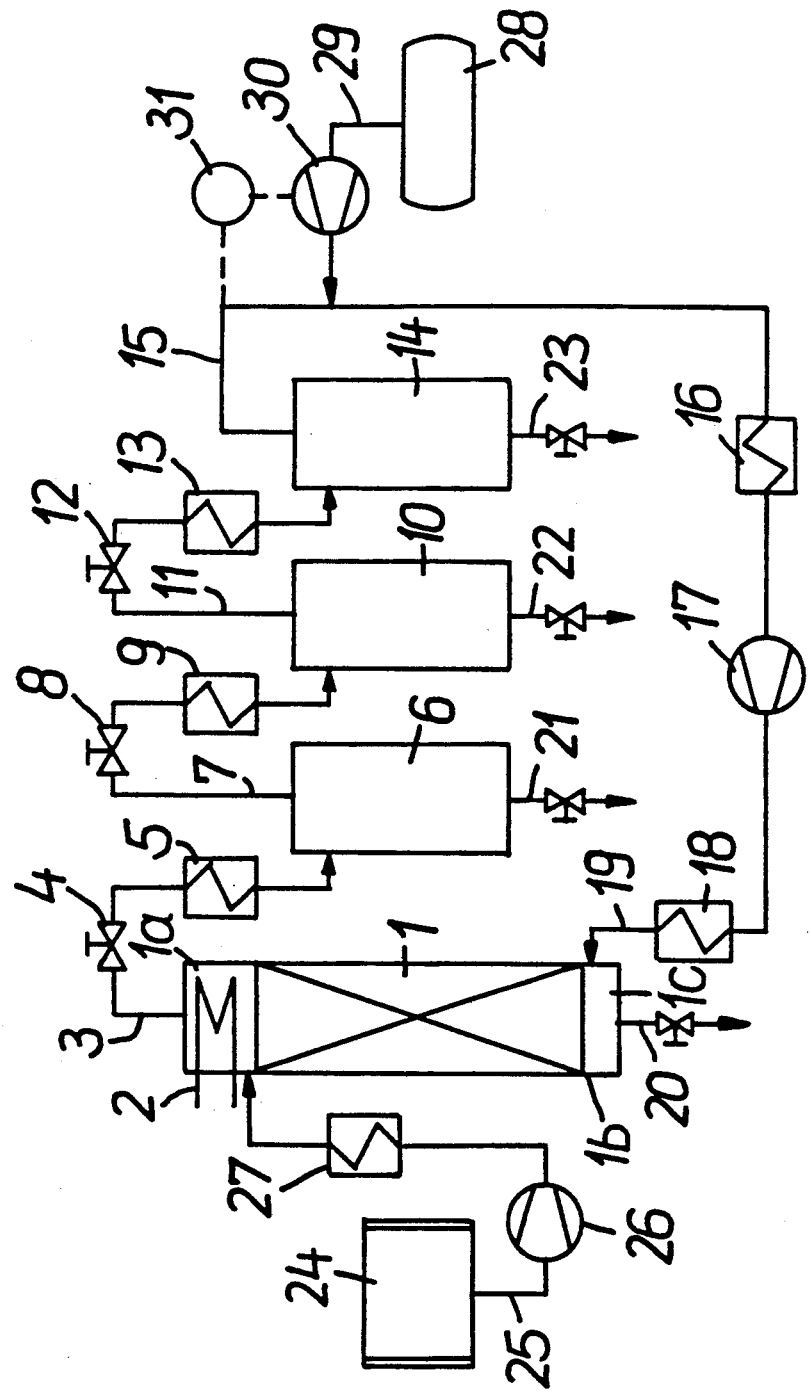
FIG. 1 is an exemplary flow chart for a process for the continuous extraction of a mixture of organic substances, including high boiling point constituents and/or constituents which do not boil but melt, according to the invention.

As schematically shown in FIG. 1, starting material is taken through conduit 25 from a thermostatically controlled reservoir 24, is brought by means of pump 26 and heat exchanger 27 to conditions of pressure and temperature effective for extraction thereof by a supercritical solvent, and is fed into a head portion 1a of an extraction vessel 1 which is, for example, a columnar extraction autoclave. In extraction vessel 1, supercritical solvent is fed in through conduit 19 into a bottom portion 1b of the extraction vessel 1 above sump portion 1c in a direction which is countercurrent to the feed direction of the starting material, after the solvent has been brought to conditions of temperature and pressure effective for supercritical extraction of the starting material by means of heat exchanger 18 and compressor 17. The supercritical solvent then takes up (dissolves) the substances to be extracted (the extract) within extraction vessel 1. The solvent phase charged with the extract then travels through conduit 3 into separators 6, 10 and 14. Extraction residue is removed from extraction vessel 1 through conduit 20. By mans of heat exchanger 2 built into extraction vessel 1, a slight return flow is created and, thus, separation efficiency of the extraction stage of the process is improved.

In separators 6, 10 and 14, extraction fractions are separated by respectively changing the density of the solvent phase in a well-known manner and removed through conduits 21, 22 and 23. The separation conditions are set by means of pressure control valves 8 and 12, and pressure regulator 31, as well as heat exchangers 5, 9 and 13. Solvent losses are compensated for by circulating solvent from solvent vessel 28 through conduit 29 by means of pump 30. Solvent from separator 14 may be liquefied in heat exchanger 16.

Figure 2:
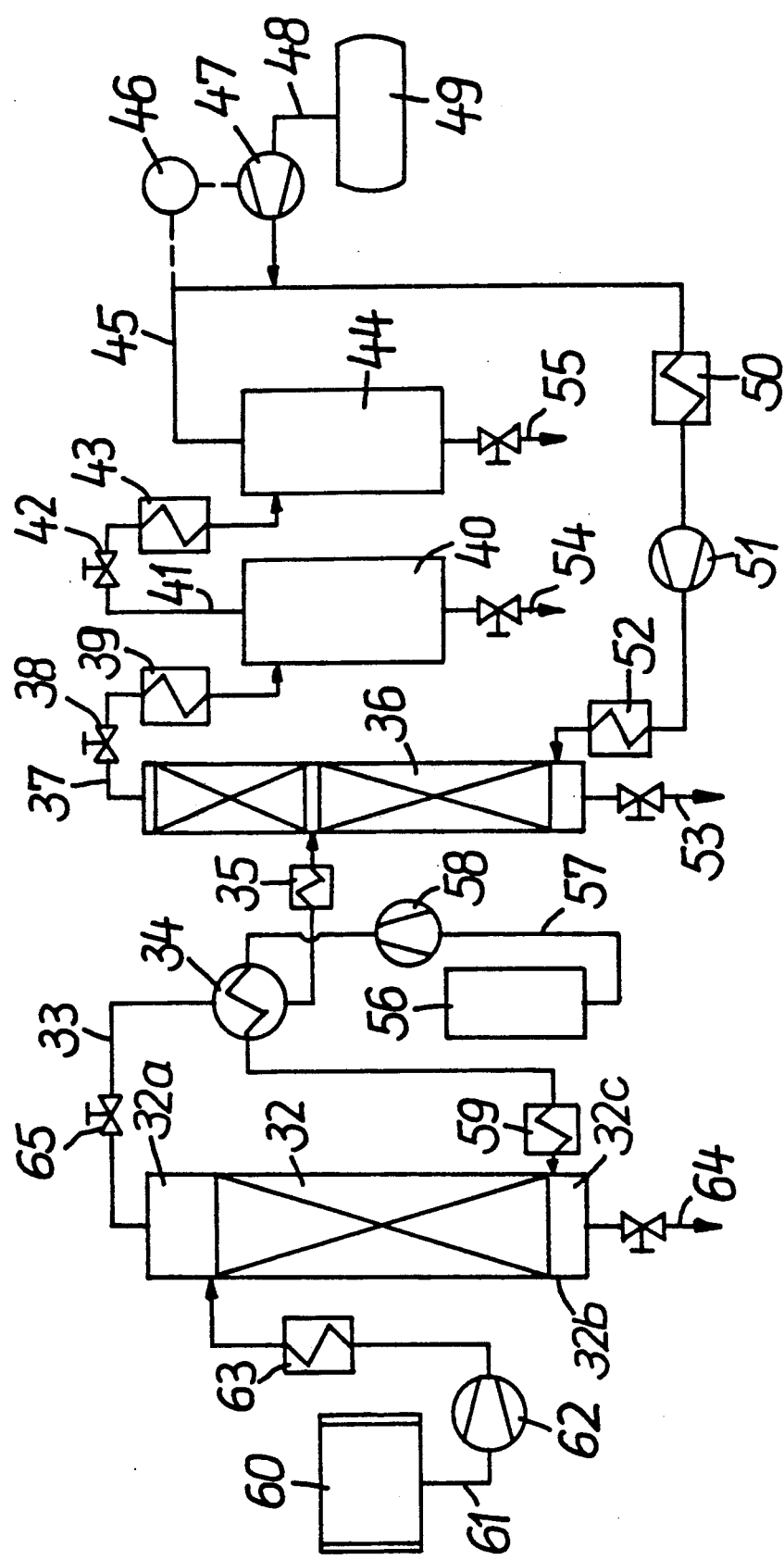
FIG. 2 is an exemplary flow chart for a process for the continuous extraction of a mixture of organic substances, including high boiling point constituents or constituents which do not boil but melt, with supercritical water, the process utilizing a subsequently-connected, second extraction column.

In FIG. 2, starting material is removed from reservoir 60, which is thermostatically controlled, through conduit 61, is brought to conditions of pressure and temperature effective for extraction by means of pump 62 and heat exchanger 63, and is fed into a head portion 32a of extraction vessel 32, which is a columnar extraction autoclave. Water is removed from water reservoir 56 via conduit 57 and is brought to conditions of temperature and pressure effective for utilization as a supercritical solvent in the supercritical extraction process in heat exchanger 34 and compressor 58, respectively. Supercritical water, i.e., water in the supercritical state, is conducted into a bottom portion 32b of extraction vessel 32 above sump portion 32c and is, thus, fed in a direction which is countercurrent to the feed direction of the starting material and takes up the substances to be extracted (the extract). The solvent phase charged with the extract travels through conduit 33, heat exchangers 34 and 35 into subsequently-connected, second extraction vessel 36, which is a columnar extraction autoclave and which is positioned downstream of extraction column 32. Extraction residue is removed from extraction vessel 32 through conduit 64.

The connections of the conduits 35 and 37 to the extraction vessel 36 are to be performed in well known manner so that the amount of water flowing through conduit 37 is minimized, e.g. as indicated schematically in FIG. 2.

The solvent phase from the first extraction stage conducted in extraction vessel 32 is liquefied by pressure reduction by means of pressure control valve 65 and temperature reduction in heat exchangers 34 and 35 to provide a mixture extract and water. This mixture is extracted countercurrently with a supercritical hydrocarbon or a supercritical hydrocarbon mixture in second extraction column 36 to provide a second extraction stage.

The supercritical solvent phase from second extraction column 36, charged with at least part of the extract, travels through conduit 37 into separators 40 and 44, possibly after being liquefied by pressure reduction by means of pressure control valve 38 and by temperature reduction in heat exchanger 39. The aqueous phase, possibly including part of the extract obtained from extraction vessel 32, is continuously discharged from column 36 through conduit 53. Extraction fractions are separated in separators 40 and 44 respectively, by changing the density of the solvent phase in the well-known manner, i.e., relaxing (reducing) the temperature and pressure, and are respectively removed through conduits 54 and 55. Separation conditions of temperature and pressure are set by means of pressure control valve 42, pressure regulator 46 and heat exchangers 39 and 43. Solvent losses are made up by adding solvent from solvent vessel 49 through conduit 48 and pump 47 to the process circuit. The solvent which leaves the last separator, separator 44, via conduit 45 in gaseous form is brought to supercritical extraction conditions of temperature and pressure by means of pump or compressor 51 and a heat exchanger 52, possibly after liquefaction in heat exchanger 50, and is re-introduced into the bottom of second extraction column 36.

EXAMPLE 1

Hard coal tar pitch was extracted in a continuous operation according to the process schematic of FIG. 1 with three different solvents in the supercritical state, namely, propane, petroleum ether and water, in three tests. The hard coal tar pitch employed had a softening point of 71° C., an ash content of 0.20 weight % and contained 20.1 weight % of components which were insoluble in toluene and 6.5 weight % of components which were insoluble in quinoline. Moreover, the hard coal tar pitch employed had the following elemental analysis with reference to a substance free of water and ashes: 91.6 weight % C, 4.5 weight % H, 0.8 weight % O, 1.0 weight % N, and 0.7 weight % S.

Table 1 gives the test parameters and the resulting yields for the three tests. Table 2 lists the analytical values determined for the extract and the residue from tests 1 to 3 of Table 1. A significantly higher yield than known in the art is realized for the solvents of tests 2 and 3, petroleum ether and water.

EXAMPLE 2

Hard coal tar pitch of the composition given above was extracted continuously with petroleum ether (boiling range 40° C. to 70° C.) as solvent. 500 g/h hard coal tar pitch and 6 kg/h solvent, corresponding to a solvent ratio of 12 kg solvent/kg hard coal tar pitch were employed. The temperature at the head of the extraction column was 250° C. and the sump temperature was 280° C. Above the sump, the temperature decreased linearly with increasing height to provide a temperature gradient according to the invention. Separation took place in a one stage extraction at 1 bar and 85° C., with 32.6 weight % of the starting material being obtained as a reddish brown extract which was just barely flowable at ambient temperature (20° C.). The extract contained less than 0.01 weight % ashes, 0.1 weight % of substances insoluble in toluene, and 0.1 weight % of substances insoluble in quinoline.

The extraction residue was still flowable although quite viscous under the extraction conditions and could be removed continuously from the extraction vessel. Analysis data for this extraction residue are listed in Table 3. Due to favorable physical characteristics, this residue can be used, for example, in industry as a binder in the production of shaped coke for casting purposes.

EXAMPLE 3

A hop extract was fractionated according to the process schematic of FIG. 1. A hop extract starting material was obtained by extraction of dry hops with ethanol and contained less than 0.1% ethanol, 5.2% water, 74.9% soft resin and 14.1% hard resin. The hop extract starting material was brought to extraction conditions, 90° C. (entrance temperature at the head of the column) and 300 bar, and was fed in at a throughput rate of 800 g/h at the head of the extraction column (height $\times$ inner diameter = 6000 $\times$ 59 mm) filled with filler bodies. Carbon dioxide in the supercritical state was fed countercurrently into the bottom of the extraction column at a throughput rate of 20 kg/h, at a temperature of 160° C. and a pressure of 300 bar. The supercritical carbon dioxide flowing countercurrent to the downwardly flowing hop extract and is, thus, preferably charged with hop oils and soft resin constituents. The charged supercritical solvent phase is expanded in steps in three subsequently connected separators to change the density thereof. Extraction and separation conditions were set as follows:

|  | Extraction | Separation | | |
| --- | --- | --- | --- | --- |
|  |  | $A_1$ | $A_2$ | $A_3$ |
| pressure, in bar | 300 | 210 | 120 | 70 |
| temperature, in °C. |  | 70 | 52 | 40 |
| column head | 90 |  |  |  |
| column sump | 160 |  |  |  |

For better removal of the extraction residue, which was composed primarily of hard resins, chlorophyll, sugars and tannins, the extraction vessel sump was heated to 160° C. and water, at a temperature of 120° C., was pumped into the lowermost intake of the sump. The extract discharged as the first fraction still contained impurities, such as chlorophyll, oxidation products and hard resins, dissolved in the super-critical $CO_2$. The major constituent of the extract, the soft resin fraction, was removed in the second and third fractions. The resulting yields and analytic data for the raw hop extract starting material, the extraction residue and the individual extract fractions are compiled in Table 4. 95.9% of the bitters and practically all alpha acids were to be found in the second and third extract fractions.

The invention now being fully described, it will be apparent to one of ordinary skill in the art that many changes and modifications can be made thereto without departing from the spirit or scope of the invention as set forth herein.

The present disclosure relates to the subject matter disclosed in German Application P 37 43 058.0 of December 18th, 1987, the entire specification of which is incorporated herein by reference.

TABLE 1

| Test No. | Solvent | Extraction $T_{Ex}$, °C. Head | Extraction $T_{Ex}$, °C. Sump | $P_{Ex}$, bar | Separation $T_{Ab}$, °C. | Separation $P_{Ab}$, bar | Solvent ratio kg solvent/kg starting material | Yield in wgt. % of starting material |
|---|---|---|---|---|---|---|---|---|
| 1 | propane | 130 | 230 | 250 | 60 | 10 | 60.2 | 20.5 |
| 2 | petroleum ether | 250 | 280 | 250 | 85 | 1 | 12.0 | 32.6 |
| 3 | water | 410 | 410 | 300 | 100 | 1 | 10.0 | 64.3 |

TABLE 2

|  | Test 1 extract | Test 1 residue | Test 2 extract | Test 2 residue | Test 3 extract | Test 3 residue |
|---|---|---|---|---|---|---|
| ash content, wgt. % | 0.0 | 0.26 | <0.01 | 0.30 | 0.02 | 0.58 |
| insol. in toluene, weight % | 0.0 | 25.1 | 0.1 | 52.6 | 2.0 | 79.00 |
| insol. in quinoline, weight % | 0.0 | 7.4 | 0.1 | 13.7 | 0.2 | 58.90 |

TABLE 3

Analysis Data For The Hard Coal Tar Pitch Extraction Residue Of Example No. 2

| | |
|---|---|
| Softening point | 180° C. |
| Conradson value | 77.0 |
| Rough analysis (RA) | |
| water | — |
| ashes (fw*)/% | 0.5 |
| volatile components (fwa)/% | 35.1 |
| Elemental analysis (EA) | |
| C (fwa**)/% | 93.32 |
| H (fwa)/% | 4.25 |
| Mass balance of extractive decomposition | |
| Xylene extraction | |
| Insoluble in xylene - 58.3% | |
| RA | |
| water/% | 1.8 |
| ashes (fw)/% | 1.0 |
| volatile components (fwa)/% | 16.7 |
| EA | |
| C (fwa)/% | 91.32 |
| H (fwa)/% | 3.84 |

TABLE 3-continued

Analysis Data For The Hard Coal Tar Pitch Extraction Residue Of Example No. 2

| | |
|---|---|
| Soluble in xylene - 41.7% | |
| RA | |
| water/% | 0.8 |
| ashes (fw)/% | 0.1 |
| volatile components (fwa)/% | 58.1 |
| EA | |
| C (fwa)/% 91.89 | |
| H (fwa)/% | 4.71 |
| Extraction of the xylene-soluble fraction in petroleum ether | |
| Insoluble in petroleum ether (with reference to the starting extract) - 36.9% | |
| Ra | |
| water/% | — |
| ashes (fw)/% | 0.1 |
| volatile components (fwa)/% | 52.7 |
| EA | |
| C (fwa)/% | 91.74 |
| H (fwa)/% | 4.87 |
| Soluble in petroleum ether - 4.8% | |
| EA | |
| C (fwa)/% | 91.44 |
| H (fwa)/% | 5.25 |

*(fw) = (free of water)
**(fwa) = (free of water and ashes)

TABLE 4

| | Starting Material | Residue | Extract 1st Fraction | Extract 2nd Fraction | Extract 3rd Fraction |
|---|---|---|---|---|---|
| yield, weight % | 100 | 17.80 | 1.70 | 54.20 | 26.30 |
| conductometer value, % | 39.75 | 20.40 | 31.00 | 52.48 | 40.06 |
| alpha acids, % | 35.55 | 0.92 | 26.45 | 52.01 | 39.07 |
| ISO-alpha acids, % | 3.45 | 11.87 | 1.90 | 1.70 | 3.50 |
| CBV*, % | 41.50 | 20.86 | 31.95 | 53.33 | 41.80 |
| alpha + ISO, % | 38.0 | 12.79 | 28.35 | 53.70 | 42.57 |

*CBV = Conductometer Bitter Value

What is claimed is:

1. A process for continuous, supercritical phase extraction of a mixture of organic substances with at least one solvent in the supercritical state, which mixture includes at least one extractable organic substance capable of being taken up into the supercritical phase and having at least one of (a) a high boiling point and (b) a melting point or melting range but no boiling point, and which at least one solvent is selected from the group consisting of $CO_2$, propane, butane, pentane, petroleum ether, and water and therein the at least one solvent has a critical temperature, $T_k$, and has a critical pressure, $P_k$, the process comprising:

a. providing an extraction vessel comprised of an extraction column, the extraction column extending vertically, having a head portion at the upper end thereof and a sump portion at the lower end thereof, and having a temperature gradient which deceases from the sump portion to the head portion, wherein the sump portion has a temperature effective to maintain extraction residue in a flowable state thereby permitting continuous removal thereof from the sump portion, and wherein the head portion has a temperature effective to provide an optimum take up of the extractable substances into the at least one solvent in the critical state; and b. extracting the mixture of organic substances with the at least one solvent in the supercritical state at a pressure, P, ranging from $P > P_k$ up to $P < 400$ bar and at a temperature, T, of at least $T > T_k$ to provide a charged fluid phase comprised of extracted substances, and an extraction residue.

2. The process for claim 1, wherein the temperature gradient is characterized by the temperature, T, decreasing linearly from the sump portion up to the head portion, and wherein the mixture of organic substances is introduced into the head portion of the extraction column, and wherein the at least one solvent in the supercritical state is introduced countercurrently into a bottom portion of the extraction column above the sump portion.

3. The process according to claim 1, wherein the extraction residue includes at least one gaseous constituent, wherein the process further comprises separating the at least one gaseous constituent from the extraction residue, and wherein the extraction residue, after separation, has a softening temperature of at least 120° C.

4. The process according to claim 3, wherein the extraction residue, after separation, has a softening temperature ranging from 150° C. to 220° C.

5. The process according to claim 1, wherein water is added to the extraction column.

6. The process according to claim 5, wherein at least one substance is added to the water to improve the wettability of the water.

7. The process according to claim 1, wherein up to 20 weight % of an entraining agent is added to the at least one solvent.

8. The process according to claim 7, wherein the entraining agent is selected from the group consisting of toluene and ethanol.

9. The process according to claim 1, wherein the charged fluid phase is fractionated in a plurality of separators connected downstream of the extraction vessel and wherein a first separator provides a first fraction, which first fraction is returned to the extraction vessel or is processed separately.

10. The process according to claim 1, wherein the at least one solvent is recirculated to the extraction vessel.

11. A process for continuous, supercritical phase extraction of a material selected from the group consisting of coal and a petroleum product with at least one hydrocarbon in the supercritical state, which material includes at least one extractable organic substance capable of being taken up into the supercritical phase and having at least one of (a) a high boiling point and (b) a melting point or melting range but no boiling point, and, which at least one hydrocarbon has three to five carbon atoms, has a critical temperature, $T_k$, and has a critical pressure, $P_k$, the process comprising:

a. providing an extraction vessel comprised of an extraction column, the extraction column extending vertically, having a head portion at the upper end thereof and a sump portion at the lower end thereof, and having a temperature gradient which decreases from the sump portion to the head portion, wherein the sump portion has a temperature effective to maintain extraction residue in a flowable state thereby permitting continuous removal thereof from the sump portion, and wherein the head portion has a temperature effective to provide an optimum take up of the extractable substances into the at least one solvent in the critical state; and b. extracting the mixture of organic substances with the at least one solvent in the supercritical state at a pressure, P, ranging from $P > P_k$ up to $P_{21}$ 400 bar and at a temperature, T, of at least $T > T_k$ to provide a charged fluid phase comprised of extracted substances, and an extraction residue.

12. The process for claim 11, wherein the temperature gradient is characterized by the temperature, T, decreasing linearly from the sump portion up to the head portion, and wherein the mixture of organic substances is introduced into the head portion of the extraction column, and wherein the at least one solvent in the supercritical state is introduced countercurrently into a bottom portion of the extraction column above the sump portion.

13. THe process according to claim 11, wherein prior to extraction with at least one hydrocarbon, the material is subjected to extraction in another but similarly characterized extraction vessel with water in the supercritical state to provide a charged fluid phase comprised of water and the at least one extractable organic substance, wherein the charged fluid phase is relaxed by reducing the pressure and temperature thereof to provide a liquid mixture comprising water and extract, and wherein at least a part of the liquid mixture is then subjected to extraction with the at least one hydrocarbon in the supercritical state to provide a second charged fluid phase, followed by separation of the second charged fluid phase into respective extraction fractions in separator means connected downstream of the extraction vessel.

14. The process according to claim 13, wherein the at least one hydrocarbon is selected from the group consisting of propane, n-butane, and iso-butane, and wherein the at least one hydrocarbon in the supercritical state is at a temperature ranging from 150° to 400° C. and at a pressure of 300 bar $> P > P_k$.

15. The process according to claim 11, wherein the extraction residue includes at least one gaseous constituent, wherein the process further comprises separating the at least one gaseous constituent from the extraction residue, and wherein the extraction residue, after separation, has a softening temperature of at least 120° C.

16. The process according to claim 15, wherein the extraction residue, after separation, has a softening temperature ranging from 150° C. to 220° C.

17. The process according to claim 11, wherein water is added to the extraction column.

18. The process according to claim 17, wherein at least one substance is added to the water to improve the wettability of the water.

19. The process according to claim 11, wherein up to 20 weight % of an entraining agent is added to the at least one solvent.

20. The process according to claim 19, wherein the entraining agent is selected from the group consisting of toluene and ethanol.

21. The process according to claim 11, wherein the charged fluid phase is fractionated in a plurality of separators connected downstream of the extraction vessel and wherein a first separator provides a first fraction, which first fraction is returned to the extraction vessel or is processed separately.

22. The process according to claim 11, wherein the at least one solvent is recirculated to the extraction vessel.

23. A process for continuous, supercritical phase extraction of a raw vegetable extract extract including a raw hop extract with at least one solvent in the supercritical state, which raw vegetable extract includes at least one extractable organic substance capable of being taken up into the supercritical phase and having at least one of (a) a high boiling point and (b) a melting point or melting range but no boiling point, and which at least one solvent is selected from the group consisting of $CO_2$ and propane, and wherein the at least one solvent has a critical temperature, $T_k$, and has a critical pressure, $P_k$, the process comprising:
   a. providing an extraction vessel comprised of an extraction column, the extraction column extending vertically, having a head portion at the upper end thereof and a sump portion at the lower end thereof, and having a temperature gradient which decreases from the sump portion to the head portion,
   wherein the sump portion has a temperature effective to maintain extraction residue in a flowable state thereby permitting continuous removal thereof from the sump portion, and
   wherein the head portion has a temperature effective to provide an optimum take up of the extractable substances into the at least one solvent in the critical state; and
   b. extracting the mixture of organic substances with the at least one solvent in the supercritical state at a pressure, P, ranging from $P > P_k$ up to $P < 400$ bar and at a temperature, T, of at least $T > T_k$ to provide a charged fluid phase comprised of extracted substances, and an extraction residue.

24. The process for claim 23, wherein the temperature gradient is characterized by the temperature, T, decreasing linearly from the sump portion up to the head portion, and wherein the mixture of organic substances is introduced into the head portion of the extraction column, and wherein the at least one solvent in the supercritical state is introduced countercurrently into a bottom portion of the extraction column above the sump portion.

25. The process according to claim 23, wherein the extraction residue includes at least one gaseous constituent, wherein the process further comprises separating the at least one gaseous constituent from the extraction residue, and wherein the extraction residue, after separation, has a softening temperature of at least 120° C.

26. The process according to claim 25, wherein the extraction residue, after separating has a softening temperature ranging from 150° C. to 220° C.

27. The process according to claim 23, wherein water is added to the extraction column.

28. The process according to claim 27, wherein at least one substance to improve the wettability is added to the water to improve the wettability of the water.

29. The process according to claim 23, wherein up to 20 weight % of an entraining agent is added to the at least one solvent.

30. The process according to claim 29, wherein the entraining agent is selected from the group consisting of toluene and ethanol.

31. The process according to claim 29, wherein the entraining agent is selected from the group consisting of n-butane, iso-butane, and ethanol.

32. The process according to claim 23, wherein the charged fluid phase is fractionated in a plurality of separators connected downstream of the extraction vessel and wherein a first separator provides a first fraction, which first fraction is returned to the extraction vessel or is processed separately.

33. The process according to claim 23, wherein the at least one solvent is recirculated to the extraction vessel.

* * * * *